July 15, 1941. D. A. YOUNG ET AL 2,249,075
TEST DEVICE FOR DETACHABLE ELECTRICAL INSTRUMENTS
Filed Nov. 26, 1938 2 Sheets-Sheet 1
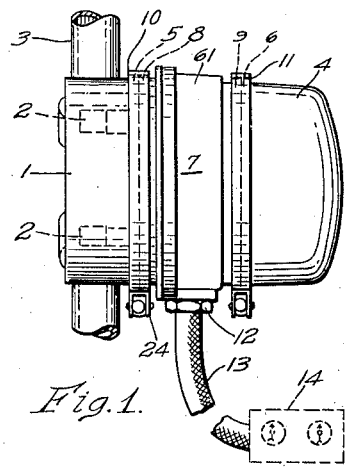
Fig.1.
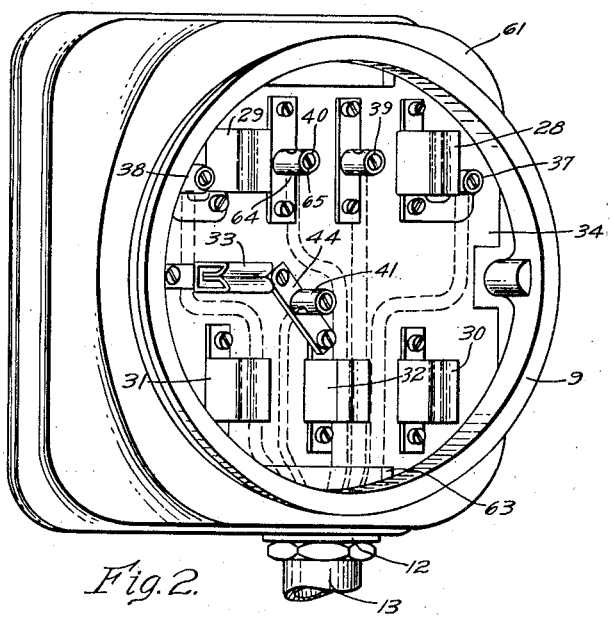
Fig.2.
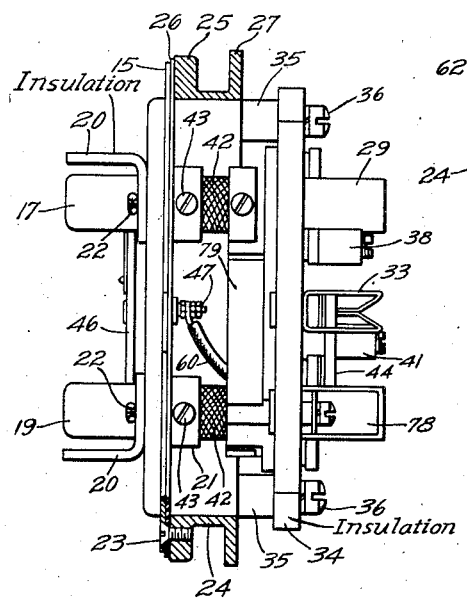
Fig.3.
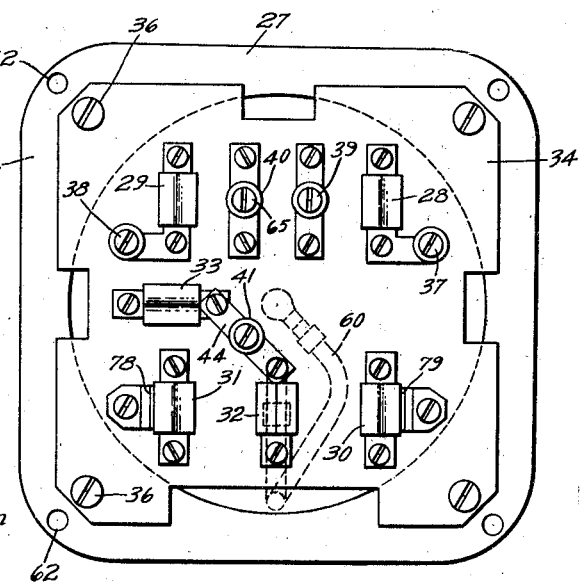
Fig.4.
WITNESSES:
INVENTORS
Douglass A. Young
and Carl Oman.
BY
ATTORNEY July 15, 1941.    D. A. YOUNG ET AL    2,249,075
TEST DEVICE FOR DETACHABLE ELECTRICAL INSTRUMENTS
Filed Nov. 26, 1938    2 Sheets-Sheet 2

WITNESSES:
C. J. Weller.
C. L. Freedman.

INVENTORS
Douglas A. Young
and Carl Oman,
BY
ATTORNEY

Patented July 15, 1941

2,249,075

UNITED STATES PATENT OFFICE 2,249,075

TEST DEVICE FOR DETACHABLE ELECTRICAL INSTRUMENTS

Douglass A. Young and Carl Oman, East Orange, N. J., assignor to Westinghouse Electric & Manufacturing Company, East Pittsburgh, Pa., a corporation of Pennsylvania Application November 26, 1938, Serial No. 242,594

13 Claims. (Cl. 175—183)

This invention relates to detachable instruments and it has particular relation to test devices for use with such instruments.

Instruments of the type disclosed in the Bradshaw Patents Nos. 1,969,499 and 2,081,981 and in the Young et al. Patent No. 2,128,277, all assigned to the Westinghouse Electric & Manufacturing Company, have achieved a widespread popularity. These instruments comprise in general a socket containing contact jaws which are wired permanently to a circuit in which an instrument is to be employed. The instrument is provided with contact blades which are insertable in and removable from the contact jaws. Ordinarily, a seal of some type is employed for protecting the detachable instrument assembly from tampering.

In order to test these instruments, it has been customary in the past to provide a separate testing connection for each socket structure. These connections have no protection against tampering, and for that reason could not be employed for tests covering periods of long duration with any assurance against disturbance of the test conditions. Moreover, the equipment available heretofore has required a separate unit for each socket type with resultant increases in the total number of parts required.

In accordance with our invention, an insert device is provided for test purposes. This device is placed between a detachable instrument and its socket and carries contact blades positioned to be inserted in the contact jaws of the socket. The insert device also carries contact jaws positioned to receive the contact blades of the instrument. In order to guard against any disturbance of the test conditions, the insert device is provided with flanges or other attaching means. When flanges are employed, they may be positioned to abut against corresponding flanges of the socket and instrument, and conventional sealing rings then may be employed for sealing the socket, insert device and instrument in operative position for the duration of the test. Preferably, the insert device is provided with outlet conductors which may be attached to any suitable measuring instruments or other equipment required for the test, such as ammeters, voltmeters, wattmeters, power factor meters or other devices for measuring electrical quantities, and these devices may be of the indicating type, the integrating type or the recording type. As a specific example of a test unit suitable for most purposes, reference may be made to the compact, industrial analyzing unit disclosed in the Lunas Patent No. 2,018,272, which is assigned to the Westinghouse Electric & Manufacturing Company.

To increase the flexibility of the insert device, certain of the contacts may be movably mounted so that they may be adjusted for use with various socket arrangements.

For those tests in which no detachable instrument is required, the insert device may take the form of a housing having only one flange positioned to abut a flange on a detachable socket, so that only one sealing ring is required for sealing the unit in place. Preferably, this housing extends completely over the terminal and contact structure carried by the housing, whereby the sealing of the insert device to the socket completely protects all contact elements.

It is, therefore, an object of our invention to provide an insert device which may be sealed in operative position.

It is another object of our invention to provide an insert device which may be sealed both to a detachable instrument and to the socket of a detachable instrument.

It is a further object of our invention to provide an insert device having contact elements adjustable for utilization with detachable instrument installations having different contact arrangements.

Other objects of our invention will be apparent from the following description taken in conjunction with the accompanying drawings, in which:

Figure 1 is a view in side elevation of a detachable instrument assembly including an insert device designed in accordance with our invention;

Fig. 2 is a view in front perspective of the insert device shown in Fig. 1;

Fig. 3 is a view in side elevation with parts removed and parts broken away of the insert device shown in Figs. 1 and 2;

Fig. 4 is a view in front elevation of the insert device assembly shown in Fig. 3;

Figure 5:
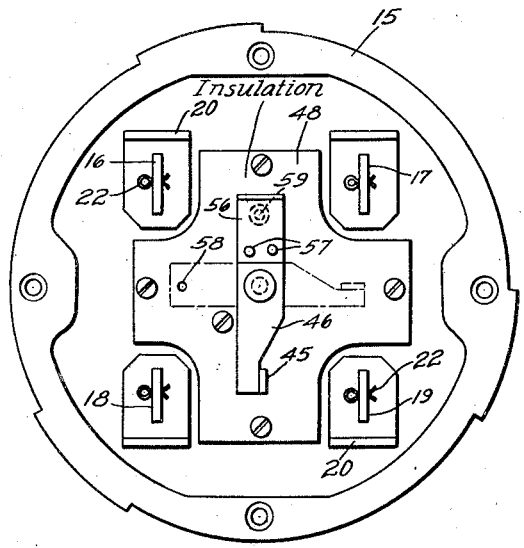
Fig. 5 is a view in bottom plan of a base plate suitable for the insert device shown in Figs. 1 to 4.
Figure 6:
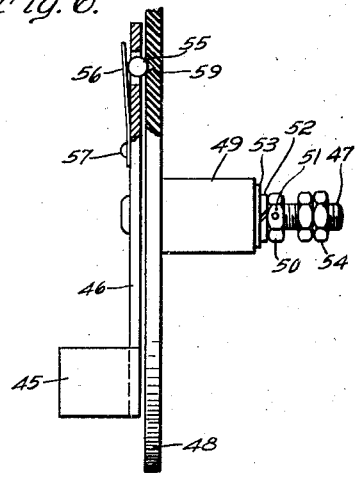
Fig. 6 is a detailed view with parts broken away of an adjustable contact blade provided on the base plate of Fig. 5.

Referring to the drawings, Fig. 1 shows a detachable instrument of the type disclosed generally in the aforesaid Bradshaw patents. In this type of instrument a socket 1 is provided which contains a plurality of contact jaws 2. Conductors are led into the socket through conduits 3 for connection to the contact jaws. These contact jaws are positioned to receive contact blades carried by a detachable instrument 4. Flanges 5 and 6 are provided respectively on the socket 1 and the instrument 4. When the instrument is placed in operative position with its contact blades in the contact jaws 2 of the socket, the flanges 5 and 6 abut each other and may be sealed in place by means of a conventional sealing ring.

In order to conduct a test on the circuit running through the conduits 3 or on the instrument 4 or for other purposes, we place between the socket 1 and the instrument 4 an insert device 7 which is provided with two flanges 8 and 9. These flanges are positioned to abut respectively the flange 5 of the socket and the flange 6 of the instrument. In these positions, sealing rings 10 and 11 may be employed for sealing the abutting flanges, thereby preventing any unauthorized person from tampering with the installation.

If desired, an instrument suitable for making the test desired may be built directly into the housing of the insert device 7. Ordinarily, however, it is preferable to provide a bushed opening 12 in the housing for conductors which may be carried in a cable 13 to a suitable measuring instrument 14. The cable 13 may be of the multi-conductor type and may be armored or not, as desired.

Referring more particularly to Figs. 2 to 6, it will be noted that the insert device includes a base plate 15 and contact blades 16, 17, 18 and 19 which are in general similar to those disclosed in the aforesaid Bradshaw patents for use as bases for detachable instruments. In general, the contact blades pass through insulating bushings provided in the base plate 15 which include insulating guides 20, and the blades are retained in place by means of enlarged heads 21 and cotter pins 22. This base plate assembly is attached in any suitable way, as by machine screws 23, to a ring 24 provided with a circular flange 25 for reception of the base plate. Preferably, a gasket 26 is interposed between the base plate 15 and the flange 25. The ring 24 carries at its other end a square flange 27.

For receiving the detachable instruments, a plurality of jaws 28, 29, 30, 31, 32 and 33 are mounted on an insulating panel 34, which is attached to bosses 35 carried by the ring 24 in any suitable manner, as by machine screws 36. This insulating panel also carries a plurality of terminals 37, 38, 39, 40 and 41.

It is customary in the art to mount the contact blades 16, 17, 18 and 19 flexibly in the base plate 15 in order to facilitate their insertion in the contact jaws of a socket assembly. In order to connect these contact blades with the contact jaws and terminals carried by the insulating panel 34 without destroying their flexibility, we preferably employ flexible conductors, such as braided copper ribbon 42, which may be clamped or soldered to the contact blades and to the appropriate contact jaws or terminals, as by means of screws 43. In the specific embodiment illustrated, the contact blades 16, 17, 18 and 19 are connected by flexible conductors 42 to terminals 39, 40 and contact jaws 30, 31, respectively.

In certain classes of detachable instruments, provision is made for inserting sockets in either horizontal or vertical runs of the conduit 3. When designed for use on three-wire installations, for example, such as a three-wire, three-phase installation, the detachable instrument 4 will have contact blades insertable in the contact jaws 28, 29, 30 and 31. In addition to these, it will have an additional contact blade insertable either in the contact jaw 32 or 33 dependent upon whether the installation is for a vertical or horizontal conduit 3. By providing two contact jaws 32 and 33 permanently attached to the insulating panel 34, the insert device is accommodated to receive either of these instrument mountings. Both of the contact jaws 32 and 33 are connected to the same terminal 41 by means of a conductor strip 44. Therefore, the terminal 41 will be operative regardless of the position of the additional contact blade on the detachable instrument 4.

The same problem is present in the socket structure for the three-wire instrument, but here ordinarily it is impractical to employ two contact jaws connected to a common terminal. To take care of this situation, we provide the base plate 15 with a movable contact 45 which may be adjusted into either of the positions required by the run of the conduit 3. As shown more particularly in Figs. 5 and 6, the movable contact 45 is carried by a conductive arm 46 which is pivotally mounted on a machine screw 47. The entire assembly is carried on an insulating sheet 48 which is attached in any suitable manner to the base plate 15, as by screws. A boss 49 having a hole is provided on the sheet 48 for accurately positioning the machine screw 47 which is held in position therein by means of a nut 50 that is held in adjusted position by means of a pin 51. Suitable spring and plain washers 52 and 53 are included for supporting the arm 46 for rotation with a minimum of play. Additional nuts 54 may be included for attaching a conductor to the screw 47 and through the screw to the conductive arm 46 and blade 45. The blade 45 is retained in either of its operative positions by means of a ball 55 which is freely mounted in an opening in the arm 46, and which is biased against the sheet 48 by means of a leaf spring 56 secured to the arm 46 by rivets 57 or otherwise. In either of the operative positions of the blade 45, the ball 55 is urged into a depression 58 or 59, which is formed in the sheet 48 and thereupon retains the blade 45 in operative position. As shown in Figs. 3 and 4, the blade 45 is connected to the jaws 32, 33 through the arm 46, screw 47, and a conductor 60.

Normally, the contact jaws and terminals mounted on the panel 34 are positioned within a cover 61 which carries the circular flange 9 employed for sealing the insert jack to the instrument 4. This cover may be attached to the ring 24 in any suitable manner as by machine screws (not shown) which are threaded into bosses provided in the cover through the openings 62. Suitable openings 63 are left in the insulating panel 34 to permit passage of conductors from the cable 13 to the various contact jaws and terminals.

The materials employed for the various parts are largely matters of choice. Preferably, parts such as the cover 61 are constructed from aluminum or other light alloys in order to reduce the overall weight of the insert device. The terminals 37, 38, 39, 40 and 41 may be of any standard construction. As illustrated (Fig. 2), each terminal includes a hole 64 for reception of a conductor and a set screw 65 for clamping the conductor in attached position.

It is believed that the operation of the structure thus far described is apparent from the foregoing description. When it is desired to obtain a measurement from the socket of a detachable instrument, a suitable measuring device 14 is connected through the cable 13 to the desired terminals mounted on the insulating panel 34. As a specific example of connections suitable for a three-phase, three-wire installation, current coils of the measuring device may be connected between the terminals 38 and 40 and between the terminals 37 and 39. Voltage responsive coils or other elements may be connected between the common terminal 41 and any of the remaining terminals. In this particular case, it may be assumed that line conductors enter through the lower conduit 3 and are connected through the blades 18, 19 and 45 to the contact jaws 30, 31 and 32, respectively. After passing through the detachable instrument 4 and measuring device 14, current is supplied to a load through the terminals 39, 40 which are connected respectively to the contact blades 16 and 17, the third connection for the load in this case being from the contact blade 45.

The various connections are shown by means of dotted lines in Fig. 2. Once these connections have been completed, they and the measuring device may remain permanently in place while a number of similar sockets and instruments are tested. For each test, the insert device is placed between each detachable instrument 4 and its socket 1 with the blades of the insert device positioned in the appropriate contact jaws of the socket and with the contact blades of the instrument in the appropriate contact jaws of the insert jack. If the test is to be of considerable duration and it is desired to prevent unauthorized access to the test equipment, the sealing rings 9 and 10 may be positioned to seal the socket 1, instrument 4 and insert device 7 into a unitary assembly which cannot be disturbed without breaking one or more of the seals employed for the sealing rings. After the necessary data has been obtained, the sealing rings may be removed, the insert device 7 withdrawn, and the instrument 4 replaced in its socket 1. The insert device then is available for measuring other installations.

Figure 7:
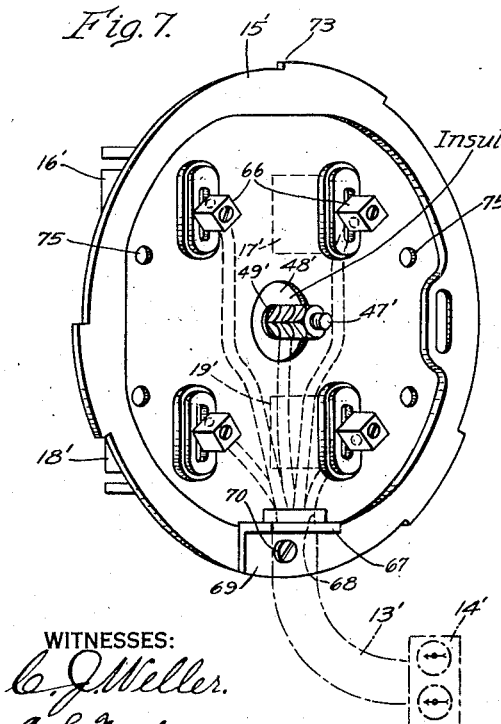
Fig. 7 is a view in perspective of a modified test device base plate designed in accordance with our invention.
Figure 8:
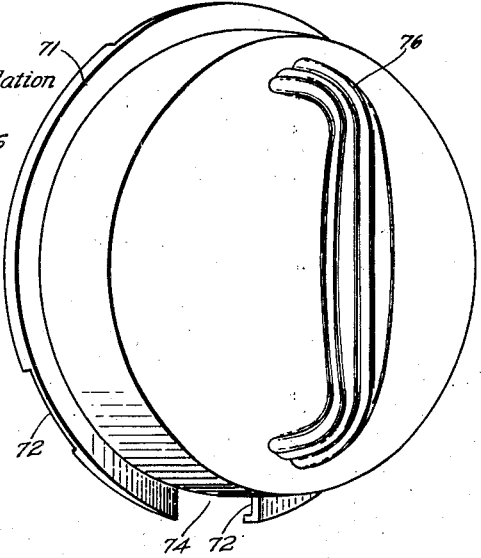
Fig. 8 is a view in perspective of a cover for the base plate shown in Fig. 7.

In some cases, it is unnecessary to leave a detachable instrument in position during the course of a test, and in other cases sockets which are not intended to receive instruments may be provided for test purposes only. Under these circumstances, the contact jaws and flange 9 of the insert device are unnecessary and may be omitted to provide a simplified construction. An example of a suitable device of this type is illustrated in Figs. 7 and 8. Here a base plate 15', and contact blades 16' to 19' are similar substantially to the corresponding elements of the insert device. In this example, however, suitable terminals 66 are connected to the contact blades in any suitable manner, as by soldering, welding, screws or integral manufacture. The base plate 15' also carries an insulating sheet 46' having a boss 49' for positioning a machine screw 47' which carries a movable contact blade (not shown) similar to the blade 45 of Fig. 5. At a suitable position on the base plate, an inlet member 67 is provided which contains an opening 68 for a cable 13' shown in dotted lines which is employed for connecting the terminal 66 to a suitable measuring device 14'. The inlet member is attached to the base plate by means of a suitable flange 69 in any convenient manner, as by a machine screw 70.

In order to protect the assembly described in the preceding paragraph, we provide a cover similar to that illustrated in Fig. 8. This cover includes a flanged portion 71 which closely abuts the periphery of the base plate 15' and which may have recesses 72 for receiving lugs 73 on the base plate. An opening 74 is provided in the cover of a size sufficient to receive snugly the inlet member 67 when the cover is in attached position. The cover may be retained in place on the base plate by means of screws (not shown) which pass through openings 75 and are threaded into suitable bosses formed on the cover. The cover also has a handle 76 by which it may be more conveniently manipulated.

The operation of the structure illustrated in Figs. 7 and 8 resembles very closely that of the insert device shown in Figs. 1 to 6. If it is desired to make a measurement from a given socket, the contact blades carried by the base plate 15' are inserted into appropriate contact jaws of the socket. If the test is to last for a long period, the device may be sealed to the socket by means of a sealing ring which engages a flange 71 of the cover and the flange of the socket which is positioned adjacent the flange 71 in operation.

Numerous variations in terminal arrangements and terminal connections readily are available in the test devices herein described. For example, it is possible to include a circuit closing structure of the type disclosed in the patent of Bradshaw et al. No. 2,096,479, assigned to the Westinghouse Electric & Manufacturing Company. Such a structure is illustrated generally in Figs. 3 and 4 wherein spring conductive strips 77, 78 are positioned adjacent certain of the contact jaws 30, 31 for movement into and out of electrical contact therewith when contact blades are withdrawn from and inserted in the contact jaws. Each strip may be electrically connected to another contact jaw or terminal for preserving circuit continuity when a detachable instrument is not mounted on the insert device. For this purpose, the strip 78 may be electrically connected to the contact jaw 29 by a conductor strap 79. Further details of this circuit closing structure are described in the aforesaid patent of Bradshaw et al.

It is obvious that our invention is susceptible to many modifications. Therefore, we do not desire our invention to be restricted except as required by the appended claims when interpreted in view of the prior art.

We claim as our invention:

1. In an insert device, a support, contact blade means, means for flexibly mounting said contact blade means in substantially fixed position on said support, contact jaw means positioned on said support, and flexible means conductively connecting said blade means to said jaw means.

2. In an insert device, a support, contact blade means, means for flexibly mounting said contact blade means in substantially fixed position on said support, contact jaw means positioned on said support, terminal means positioned on said support, and flexible means conductively connecting said blade means to said jaw means and terminal means.

3. In an insert device, a housing having a pair of spaced circular flanges, contact jaw means positioned within said housing and accessible through an opening surrounded by one of said flanges, contact blade means projecting from a face of said housing, terminal means within said housing, and circuit completing means between said contact jaw means, contact blade means and terminal means including conductor means extending through an opening in said housing.

4. In a detachable assembly, an instrument, a receptacle, said instrument and receptacle having mating attaching means, and a housing positioned between said instrument and said receptacle, said housing having attaching means which mate respectively with the attaching means of said instrument and said receptacle.

5. In a detachable assembly, an instrument having a flange, a receptacle having a flange, said instrument and receptacle having detachable contact making means which are in operative position when said flanges are adjacent each other, a housing interposed between said flanges, a pair of flanges on said housing positioned to be adjacent said first-mentioned flanges, and circuit completing means in said housing for detachably connecting said contact making means.

6. In a detachable assembly, an instrument having a flange, a receptacle having a flange, said instrument and receptacle having detachable contact making means which are in operative position when said flanges are adjacent each other, a housing interposed between said flanges, a pair of flanges on said housing positioned to be adjacent said first-mentioned flanges, circuit completing means in said housing for detachably connecting said contact making means, an opening in said housing, and conductor means extending from said circuit completing means through said opening.

7. In a detachable electrical unit, an insert device comprising a support, contact blade means carried by said support, terminal means connected to said contact blade means, a removable enclosure for said terminal means, a flange extending substantially around said insert device, said insert device having an opening therein for providing access to said terminal means, and conductor means extending from said terminal means through said opening.

8. In an insert device, a support, a plurality of contact jaws accessible from a first face of said support, and a contact blade accessible from a second face of said support, said blade being movable from a position aligned with one of said jaws to a position aligned with another of said jaws.

9. An insert device for a socket having a plurality of contact jaws one of said contact jaws being mountable in positions differing relative to the pattern of the remainder of said jaws, said device having a plurality of contact blades insertable in said jaws, one of said blades being movably mounted for movement to positions corresponding to the positions of said one of said jaws.

10. In an insert device for a detachable instrument installation having flanged elements, having a sealing ring for the flanges on said elements and having mating contact jaw and contact blade means on said elements, a housing, flange means on said housing for facilitating attachment of said housing to one of said flanged elements, said flange means being proportioned for retention in said sealing ring, contact jaw means substantially immovably mounted on said housing for receiving the contact blade means of a detachable instrument installation, and contact blade means substantially immovably mounted on said housing for engaging the contact jaw means of a detachable instrument installation.

11. In an insert device for a detachable instrument installation having flanged elements and having mating contact jaw and contact blade means on said elements, a housing, flange means on said housing and substantially coextensive therewith for facilitating attachment of said housing to one of said flanged elements, contact jaw means substantially immovably mounted on said housing for receiving the contact blade means of a detachable instrument installation, contact blade means substantially immovably mounted on said housing for engaging the contact jaw means of a detachable instrument installation, and electrical connector means extending between said contact blade means and said contact jaw means.

12. In an insert device for detachable instrument installations having mating contact jaws and contact blades, a support, a plurality of insert contact jaws mounted on said support in a predetermined pattern for receiving the contact blades of a detachable instrument, a plurality of insert contact blades mounted on said support in a pattern corresponding to said predetermined pattern for cooperation with the contact jaws of a detachable instrument installation, said insert contact blades being mounted with slight flexibility at substantially fixed positions on said support, and flexible means conductively connecting said insert contact blade means to said insert contact jaw.

13. In an insert device for detachable instrument installations having mating contact jaws and contact blades, a support, a plurality of insert contact jaws mounted on said support in a predetermined pattern for receiving the contact blades of a detachable instrument, a plurality of insert contact blades mounted on said support in a pattern corresponding to said predetermined pattern for cooperation with the contact jaws of a detachable instrument installation, a plurality of additional contact jaws mounted on said support, and an additional contact blade adjustable into any of a plurality of positions which bear the same relation relative to the pattern of said insert contact blades as said additional contact jaws bear to said contact jaw pattern.

DOUGLASS A. YOUNG.
CARL OMAN.